US005988583A

United States Patent [19]

Rhine

[11] Patent Number: 5,988,583

[45] Date of Patent: Nov. 23, 1999

[54] ANTENNA MOUNTING ASSEMBLY

[75] Inventor: Jeff J. Rhine, Poway, Calif.

[73] Assignee: Qualcomm Incorporated, San Diego, Calif.

[21] Appl. No.: 08/742,254

[22] Filed: Oct. 31, 1996

[51] Int. Cl.[6] .................................................... A01K 97/10

[52] U.S. Cl. .......................... 248/536; 248/523; 248/539; 343/878

[58] Field of Search .................................... 248/519, 523, 248/524, 525, 534, 536, 539, 220.21, 220.31, 220.41, 221.11, 222.13, 231.9; 343/878, 890, 700 MS

[56] References Cited

U.S. PATENT DOCUMENTS

| | | | |
|---|---|---|---|
| 2,439,061 | 4/1948 | Shur | 248/536 |
| 2,439,062 | 4/1948 | Shur | 248/536 |
| 2,439,063 | 4/1948 | Shur | 248/536 |
| 4,496,828 | 1/1985 | Kusmierz et al. | 219/405 |
| 4,624,420 | 11/1986 | Pilao | 241/298 |
| 4,669,688 | 6/1987 | Itoh et al. | 248/68.1 |
| 4,823,736 | 4/1989 | Post et al. | 118/730 |
| 5,220,712 | 6/1993 | Taki et al. | 24/614 |
| 5,291,211 | 3/1994 | Tropper | 343/890 |
| 5,548,813 | 8/1996 | Charas et al. | 455/33.3 |

FOREIGN PATENT DOCUMENTS

| | | | |
|---|---|---|---|
| 0624919 | 11/1994 | European Pat. Off. | H01Q 25/00 |

*Primary Examiner*—Ramon O. Ramirez
*Assistant Examiner*—Gwendolyn Baxter
*Attorney, Agent, or Firm*—Russell B. Miller; Gregory D. Ogrod

[57] ABSTRACT

A support assembly for supporting a plurality of inclined plates (22) arranged in an array around a central axis includes a top support bracket (25) for supporting the upper edges (40) of the plates (22) and a plurality of base brackets (26) for supporting the lower edges (62) of the respective plates (22). The top support bracket (25) has a central axis aligned with the central axis of the array, and a plurality of side edges (28). Each side edge (28) has a downwardly inclined rim (32) at a predetermined angle corresponding to the desired plate orientation and a downwardly facing groove (42) for receiving the upper edge (40) of the respective plate (22). Each base bracket (26) has a base (46) for securing against a substantially flat support surface (16), a snap lock arm (52, 54) extending upwardly from the base (46) towards a respective side edge (28) of the top bracket (25) at a predetermined angle equal to the rim angle for snap engagement in an opening (60) spaced from the lower edge of the respective plate (22), and a groove (55) at the lower end of the snap lock arm (52, 54) for receiving the lower edge (62) of the respective inclined plate (22).

43 Claims, 2 Drawing Sheets

ANTENNA MOUNTING ASSEMBLY

BACKGROUND OF THE INVENTION

I. Field of the Invention

The present invention relates generally to antenna mounts, and is particularly concerned with a mounting assembly for mounting patch antennae and the like at fixed angles to a surface for receiving and transmitting signals over various angles. The invention further relates to a mounting assembly for mounting patch antennae in combination with other types of antennae.

II. Description of the Related Art

A variety of new wireless communication systems have been designed that employ communication terminals at fixed locations often referred to as "fixed telephones". Some of these communication terminals communicate using Earth orbiting satellites in non-geosynchronous orbits. A discussion of such systems can be found for example in U.S. patent application Ser. No. 08/368,570, filed Jan. 4, 1995, entitled "*Method And Apparatus For Using Full Spectrum Transmitted Power In A Spread Spectrum Communication System For Tracking Individual Recipient Phase Time And Energy*"; U.S. patent application Ser. No. 08/627,830, filed Apr. 2, 1996, entitled "*Pilot Signal Strength Control For A Low Earth Orbiting Satellite Communications System*"; and U.S. patent application Ser. No. 08/627,831, filed Apr. 2, 1996, entitled "*Using Orthogonal Waveforms To Enable Multiple Transmitters To Share A Single CDM Channel*," which are assigned to the assignee of the present invention, and is incorporated herein by reference.

One type of antenna being used for fixed installations in advanced communication systems, is the well known "patch" type of antenna. This type of antenna has radiation pattern characteristics that may offer certain advantages useful in communicating through multiple orbiting satellites. In addition, this class of antenna is naturally a "low profile" antenna which is suitable for minimizing visual impact. For example, they can help satisfy aesthetic requirements for minimal, or non-obtrusive, structures in many applications. The low profile of patch antennas can also reduce exposure of antenna elements to damage from certain environmental elements such as wind or flying objects.

Patch antennas have typically been positioned as planar elements parallel to the local horizontal of the Earth's surface. However, newer designs are being proposed that position patch antenna elements at an angle from the local horizontal. This type of positioning for the patch antenna elements is designed to improve signal transfer with transmission and reception apparatus that are not directly overhead, but are otherwise positioned off to one side of the antenna assembly and at a shallow angle relative to the planar surfaces. For example, this is useful in communicating through a satellite which is above the Earth's horizon but not yet directly above an antenna assembly. In order to accomplish this, the patch antenna elements, or supporting substrates or plates, must be mounted at fixed angles relative to the horizon or horizontal, and this is normally achieved by fasteners such as screws, bolts or the like and various support brackets or plates. The patch antenna elements are, therefore, relatively difficult to assemble into more complex structures and to remove if service or replacement is required. They are often more labor intensive and expensive to manufacture and service than desired.

At the same time, current patch antenna assembly designs have been limited to using only patch type radiator elements, including one or more elements parallel to the surface of the Earth for upwardly directed radiation patterns. However, advanced communication systems may find it more advantageous to also employ non-patch antenna elements as part of an overall antenna assembly. Unfortunately, current antenna assembly hardware does not provide for easy assembly or support of "mixed type" antenna element or radiator assemblies.

What is needed is a support assembly or support elements that can quickly and reliably secure antenna elements or support substrates in place, which are easy to work with and require few or no tools. The support assembly should result in very rigid and strong support while allowing simplified disassembly for servicing an antenna structure or associated components. At the same time, it is desirable that angled antenna elements be secured in a manner that allows them to also easily be used in conjunction with non-planar antennas or patches, as desired.

SUMMARY OF THE INVENTION

In view of the limitations found in the art, it is an object of the present invention to provide a new and improved mounting assembly for patch antenna elements and the like.

According to the present invention, a mounting assembly for a set of antenna elements is provided, each of the antenna elements comprising a flat base plate having an upper edge and a lower edge. The mounting assembly comprises a top support member having plural side edges, a vertical axis extending generally perpendicular through the top support, and at least one clip device along each side edge for snap engagement with the upper edge of a respective antenna element. The clip devices each have a support face at a predetermined angle to the vertical axis for engagement with an inner face of a respective antenna element. A plurality of base brackets are provided, each having downwardly depending snap fasteners for engagement in a horizontal support member, and a clip device for snap engagement with the lower edge of a respective antenna element, the clip device having a support face at the same angle as the support face of a corresponding clip device on the top support member. The base brackets are snap engaged in openings provided for that purpose in a base support member. Each antenna element is then snapped into a clip device on a respective side edge of the top support member at its upper edge, and into the corresponding base bracket at its lower edge, whereby it is automatically supported at the desired angle.

In some embodiments of the invention, the top support member has a central opening for engagement over a vertically extending antenna or antenna support structure. The opening defines the vertical axis for the antenna assembly, and slides over the vertical antenna.

Preferably, the top and base clip devices define a support angle in the range from around 10° to 80° to a horizontal, and the angle is preferably of the order of 30° to 60°, although the angle may vary depending on the location of the fixed antenna assembly and the patch antenna radiation pattern, and other known factors for each particular communication system application. The horizontal is typically defined as being parallel to the surface of the Earth or to a horizontal support surface for the antenna assembly. In the alternative, angles can be established relative to the vertical axis, which is generally perpendicular to the horizontal.

In a preferred embodiment of the invention, each patch antenna element is provided with a first hole adjacent its upper edge and at least second and third spaced holes adjacent its lower edge. The clip devices on the side edges of the top support member each have a downwardly facing groove for receiving the upper edge of the respective antenna element, and an upwardly facing hook member at the lower end of the support surface for snap engagement in the first hole. The base brackets each have an upwardly facing groove for slidably receiving the lower edge of the respective antenna element, and have a downwardly facing hook for snap engagement in the second or third hole. Each antenna element is snap engaged at its lower edge in the respective base bracket, and the top bracket can then slide down to engage the upper edges of the antenna elements and hold them in the desired orientation.

With this arrangement, no separate fasteners or screws are required to secure the antenna elements in position, and no tools are required to assemble the elements. The antenna elements simply slide and snap into the respective top support member and base bracket, so as to be positioned in an array around a preselected vertical axis, typically aligned with a vertical antenna, and to be automatically held up at the desired angle. The system may be assembled quickly and easily, and may be readily disassembled as required for maintenance purposes.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which.

DESCRIPTION OF THE PREFERRED EMBODIMENT

The present invention is a support assembly, or a set of support brackets, that supports a plurality of inclined plates arranged in an array around a central axis. Such assemblies are suitable for example in constructing patch antenna arrays, as discussed above. A top support bracket is used to support the upper edges of the plates and a plurality of base brackets are used to support the lower edges of the plates, and to engage a support surface. The brackets have rims and snap lock arms that extend toward each other along a common angle with respect to the central axis or to a horizontal plane. This angle establishes a predetermined support angle for the plates. The brackets engage depressions in the plates for easy installation and removal.

The invention is described below in relation to an exemplary installation that includes the use of a vertically directed antenna element, which has a central axis aligned with the central axis of the array, and the top bracket is designed with an opening for receiving and supporting the vertical antenna. However, those skilled in the art will recognize that the invention is applicable to configurations not using the vertical antenna or using a different style of vertical antenna, as desired.

Figure 1:
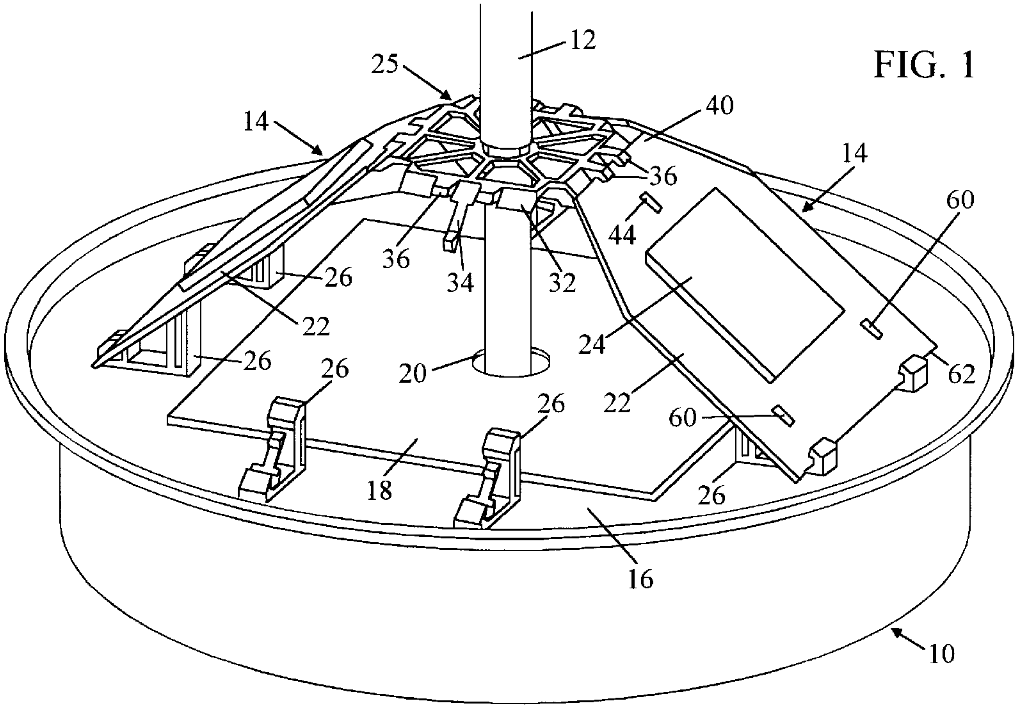
FIG. 1 is a pictorial view of a typical antenna incorporating the mounting bracket assembly according to a preferred embodiment of the present invention.

FIG. 1 illustrates an antenna assembly including a base housing 10, a vertical antenna shaft 12, and a series of patch antenna elements 14, one of which is removed for clarity, mounted around antenna shaft 12 using a mounting bracket assembly according to a preferred embodiment of the present invention. The antenna assembly may be mounted on top of a building or other suitable support structure for satellite communication purposes, as is known in the field.

Housing 10 has a cover plate 16 on which a circuit board 18 is typically secured. Cover plate 16 forms a base for the mounting bracket assembly. A central opening 20 is provided in cover plate 16 and circuit board 18, and antenna shaft 12 extends upwardly through opening 20. In this arrangement the vertical antenna allows improved communication with satellites when they are directly overhead, or above the horizon by a predetermined amount. Patch antenna elements 14 are arranged in an array around antenna shaft 12 at predetermined angles for communication with any satellite which is above the horizon in any direction from antenna shaft 12. This type of antenna assembly permits substantially continuous and highly effective communications. However, housing 10 is not a required feature of the invention, and plate 16 can comprise any of several generally planar support surfaces where it is desired to mount such an antenna assembly.

Each antenna element 14 comprises a flat base plate or support substrate 22 on which one or more planar antenna radiators 24 are mounted. The planar radiators are typically referred to simply as "patches" and are dimensioned according to well known antenna design criteria depending on the frequencies being used and desired radiation patterns. The patches or radiators are generally mounted so that they are spaced above the surface of plate 22, using techniques known in the art for patch antenna manufacture. For example, the radiators may be provided as an assembly with a conductive radiator mounted above a ground plane using a dielectric material, or support spacers. Completed assemblies can then be secured in place using a variety of fasteners, adhesives, or the like, and can use passages in plates 22 for signal feeds. Alternatively, conductive material deposited on the surface of each plate 22 can be used as a ground plane.

Each plate 22 can also support various components or circuits used for transferring signals to and from radiators 24. Alternatively, plates 22 can comprise circuit boards or substrates on which conductive feed networks and the like are formed for signal transfer and processing.

In the illustrated embodiment, four antenna elements 14 are provided around shaft 12. However, it will be understood that a greater or lesser number of antenna elements may be provided in alternative embodiments, as long as they are arranged to cover a desired horizontal range (azimuth) around the vertical antenna, as would be known. Here, that range is 360°, although lesser angular ranges could be used in some applications. In addition, depending on the antenna element design being used, the elements or their support plates need not be designed to meet along their respective planar edges for some applications. That is, they can form smaller plates or even strips that are supported in a common assembly but spaced apart at their respective edges. The antenna patches or radiators also need not occupy the majority of the support plate surface, and several such elements, even with differing sizes or areas, can be placed on a single base or support plate, depending on the antenna design.

Figure 3:
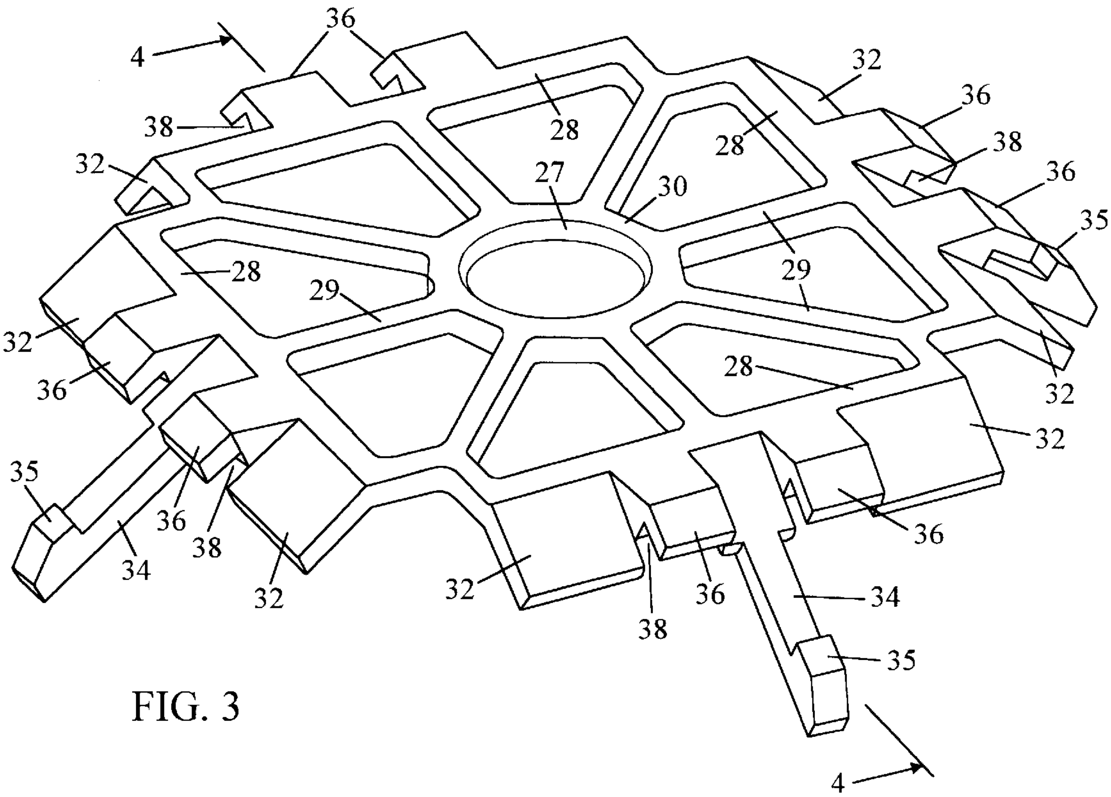
FIG. 3 is an enlarged pictorial view of the top or apex bracket.
Figure 4:
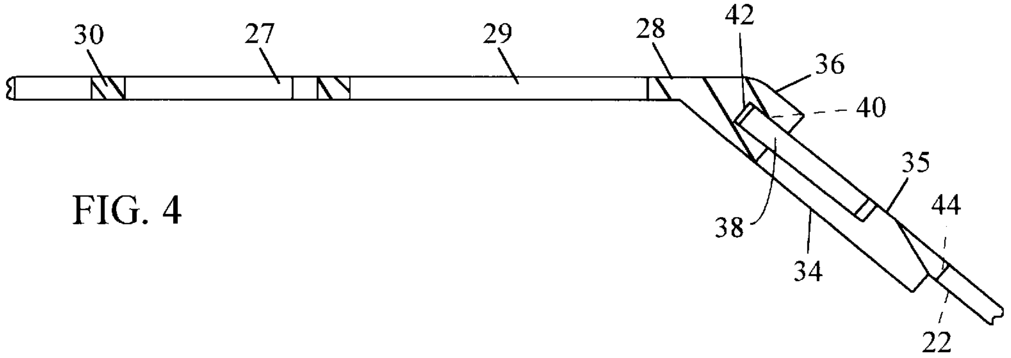
FIG. 4 is a partial sectional view taken on line 4—4 of FIG. 3.
Figure 5:
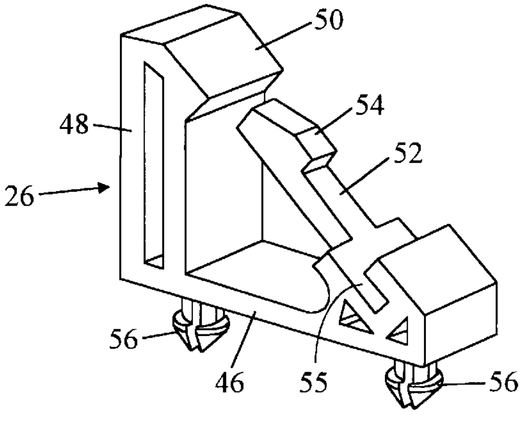
FIG. 5 is a pictorial view of a base bracket.

The mounting bracket assembly basically comprises a single top or apex bracket 25, as best illustrated in FIGS. 3 and 4, and a plurality of base brackets 26, one of which is illustrated in detail in FIG. 5. The brackets are preferably made of a lightweight, non-conductive material such as plastic, one or more resins, nylon, or the like, although other materials, even conductive materials, can be used, as desired. Top bracket 25 is of generally square or rectangular shape, and has a generally flat top surface with a central opening 27 and four side edges 28. Preferably, the top surface of the bracket is of an open matrix structure, with webs 29 connecting the side edges 28 to central ring 30 defining opening 27. For some applications, opening 27 can be more squared or polygonal in shape.

An inclined face or rim 32 at a predetermined angle to the top surface projects downwardly from each side edge 28, and a snap hook member 34 projects downwardly from the center of rim 32 at the same angle. An upwardly directed hook or latch 35 is provided at the end of hook member 34. A pair of downwardly directed clips 36 are also provided, one on each side of hook member 34, and the clips are spaced above face or rim 32, as best illustrated in FIG. 4, to provide a channel or groove 38 for receiving an upper edge 40 of a patch antenna base plate 22.

Figure 2:
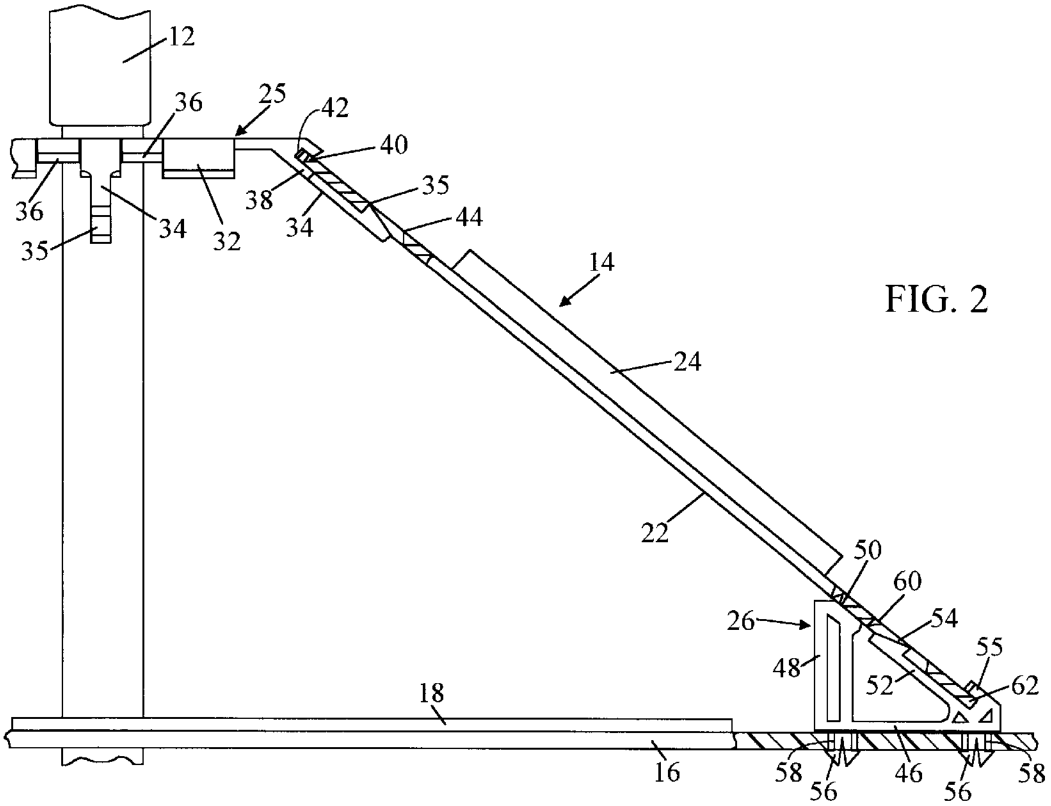
FIG. 2 is an enlarged partial side view with portions cut away.

Hook member 34 is located at a predetermined distance from the inner end face 42 of groove 38. A centrally positioned first opening 44 in antenna base plate is located at an equivalent or slightly reduced distance from upper edge 40 of the base plate, so that when the upper edge is pushed upwardly into groove 38, hook member 34 snaps into opening 44 so as to retain the upper edge in place, as best illustrated in FIGS. 2 and 4. The angle of inclination of rim 32 will determine the orientation of the antenna element, and this angle may be varied depending on the location of the antenna assembly and the desired patch antenna radiation pattern, antenna directivity, and number of elements used.

In the illustrated embodiment, the angle is about 40° elevation to the horizontal, although any angle generally in the range from 10° to 80° to the horizontal may be selected, with the range of 30° to 60° elevation typically being preferred, depending on the specific antenna application, desired directivity, and number of elements. Alternatively, the angle is measured relative to a central axis of the antenna assembly, such as established through a vertical antenna element, which is generally perpendicular to the horizontal.

In the preferred embodiment, each antenna element is also anchored along its lower edge by one or more, here two, base brackets 26. As best illustrated in FIG. 5, each base bracket is an angle member having a lower or base leg 46 and a second or upright leg 48 projecting upwardly from one end of base leg 46. Leg 48 has an inclined support face 50 at its upper end. A hook member 52, similar to hook members 34 of the top bracket, projects at an angle from the opposite end of base 46 towards support face 50, and is inclined at the same angle as face 50. Hook member 52 has an upwardly projecting hook 54 at its free end. A groove or channel 55 is provided at the lower end of hook member 52. The angle of hook member 52 and face 50 is the substantially same as the angle of rim 32 and hook members 34 of the top bracket. The first and second legs of the bracket and hook member 34 together define a generally triangular shape in side elevation, as best illustrated in FIG. 2.

A pair of split, snap-lock pins 56 project downwardly from the lower face of base 46. Cover plate 16 of the antenna housing is provided with eight pairs of openings 58 at appropriate positions for receiving pins 56 on base brackets 26 such that two base brackets will be positioned along the desired location of the lower edge 62 of each of the patch antenna elements, as best illustrated in FIGS. 1 and 2. However, it will be readily understood that as few as one, typically wider, or many more base brackets 26 could be used in some configurations to support the lower edge of one or more of the patch antenna elements. The number used will depend on well known factors such as patch element and bracket dimensions, materials, and weight to be supported, and desired assembly rigidity, as well as overall support requirements.

Pins 56 will snap into the respective openings and hold the brackets in the desired position relative to top bracket 24. Each antenna base plate is provided with a pair of lower openings 60 spaced apart by a distance equal to the spacing between each pair of base brackets, where more than one is used, and spaced from the lower edge 62 of the plate by a distance substantially equal to the spacing between the inner end of groove 55 and hook 54. Thus, the lower edge of the plate may be engaged in groove 55 and the hook will snap through opening 60 to lock the plate in position. As best illustrated in FIG. 2, when a plate is snap engaged in bracket 25 at its upper edge and engaged in a pair of base brackets at its lower edge, it will rest against inclined rim or face 32, face 50 on each base bracket, and each of the hook members, so that the plate is oriented at the desired angle as determined by the angles defined by the respective support faces of the brackets.

The antenna structure will be quick and easy to assemble using top bracket 25 and a set of eight base brackets 26 (assuming the use of two base brackets for each of four patch antenna elements). The antenna shaft is passed through center opening 27 of top bracket 25 and through opening 20 into housing 10, where it is secured. A set of eight base brackets 26 are snapped into respective openings 58 as illustrated in FIGS. 1 and 2, so that each pair of base brackets is positioned to receive the lower edge 62 of a respective patch antenna element or support plate, and support the antenna element at the desired location and orientation around the antenna shaft. The patch antenna elements then slide down into groove or channel 55 in the respective pairs of base brackets until hooks 54 snap into openings 60. The upper bracket then slides down to engage the upper edges of each antenna element under clips 38 on the respective side edge of top bracket 25 until hooks 35 snap into respective openings 44. The top bracket will then hold the top edges of the antenna elements in a stable condition. The top and base brackets therefore act to retain the antenna elements securely at the desired elevation. This assembly requires no fasteners such as screws or bolts and no tools are needed to mount the antenna elements. The patch antenna elements can be easily removed for maintenance or replacement by pressure applied to hooks 35 and 54 to disengage them from opening 44 and 60, and will be automatically held at the desired angle when reinserted in the brackets, and the hooks engage the openings.

The angle of the top bracket side rim and base bracket support face and hook member will be selected according to the desired angle of the patch antenna element, and may be in the range from 10° to 80° to the horizontal. In one embodiment, the angle was 40°, although different angles may be selected depending on a desired field of view, the general location of the antenna assembly, and desired or designed antenna radiation patterns and directivity. Thus, brackets will be provided at different angles for use in different antenna situations or within different communication systems. In addition, all antenna elements within a single assembly need not be mounted at the identical or same angle relative to a support surface or horizon. Depending on the position, type, and motion of signal sources or receivers for which the antenna elements are transferring signals, it may be desirable to mount some of the antenna elements at different angles on different sides of the antenna assembly to effect more efficient signal transfer. For example, all or portions of the antenna assembly may be designed to transfer signals with fixed transceivers or lower elevation moving communication devices as opposed to satellites, or to not transfer signals at all (portion), resulting in more irregular shapes and antenna element patterns or structures.

In the illustrated embodiment, four patch antenna elements are arranged around the periphery of the antenna shaft, generally at right angles to each other (cross-section in the horizontal plane), and are angled for communication with a satellite above the horizon in any radial direction from antenna shaft 12. However, in alternative embodiments, a greater or lesser number of patch antenna elements may be used. In this case, the top bracket will be designed with a plurality of side edges equal in number to the desired number of patch antenna elements, and one or more base brackets will be provided for each patch antenna element.

Four top bracket side edges are illustrated in FIG. 1, to accommodate an exemplary four-sided pyramidal structure. When additional sides are used, for example to form pentagonal, hexagonal, or octagonal structures with 5, 6 or 8 sides, respectively, top bracket 25 will have more joining edges. Such edges are arranged around the periphery of the top bracket, generally intersecting at angles determined by projections perpendicular to the center of each adjacent antenna plate, when viewed along the central axis (plan view). The range to be covered (here 360°) is divided by the number of antenna elements (plates) to be used to establish an angle subtended by each element, assuming equal coverage. This angle represents the intersection angle between central axis or perpendicular surface projections for adjacent elements. For example, covering a range of only 270° with 6 antenna elements yields an intersection angle of 45° for central axis or projections from each adjacent plate. The planar surfaces of adjacent elements intersect at an angle of 135°, again assuming uniform size and coverage per element.

Top bracket 25 can be generally pentagonal, hexagonal, or other well known regular polygonal shapes in appearance depending on the numbers of side panels to be accommodated. However, there is no requirement for top bracket 25 to have equally dimensioned side or edge lengths, as this depends on the individual antenna panel designs, as well as whether or not all sides are used for antenna elements, and not on features of the present invention.

Those skilled in the art will readily understand that top bracket 25 can also be flat and/or used to support a generally planar or other type of antenna element structure, or no element at all. While potentially more useful for certain communication systems, the use of a central vertically extending antenna element is not required by the present invention for all applications. Certain advantages are realized in assembly and support even without the use of a vertically directed antenna. In addition, some of the benefits of the invention are achieved from only using base brackets 26, without top bracket 25.

Although the mounting bracket assembly described above is particularly intended for supporting antenna elements at predetermined angles about a central, vertical antenna, it will be understood that the top and base brackets may alternatively be used in other applications where an array of plate-like members are to be supported at predetermined angles around a center axis. The brackets provide a quick and easy way to support such plate-like members in a stable manner, without requiring tools for assembly, and permit the supported members or plates to be readily removed and replaced as necessary. The base brackets are simply mounted in a suitable base support at the desired positions of the plate lower edges, and the plates can then be secured in the base brackets at their lower edges, with the top bracket being used to support the upper edges of the plates against movement.

The snap lock members may be replaced by any suitable alternative snap locking devices arranged at the desired orientation, such as opposing snap lock fingers or gripping elements, for example, in which case the openings in the plates or patch antenna elements may be eliminated or replaced with indents. Alternatively, the clip devices or channels may be extended and may be provided with suitable opposing snap lock formations for engagement with the opposite faces of the antenna elements.

Although a preferred embodiment of the invention has been described above by way of example only, it will be understood by those skilled in the field that modifications may be made to the disclosed embodiment without departing from the scope of the invention, which is defined by the appended claims.

What I claim as my invention is:

1. An antenna mounting assembly, comprising:

a support plate;

a plurality of patch antenna elements each having an upper edge and a lower edge;

a top bracket member having a central portion aligned with a central vertical axis extending from said support plate, a plurality of side edges at least equal in number to the number of antenna elements to be supported, and at least one clip device on each side edge for releasable engagement with the upper edge of a respective antenna element, each of said at least one clip device having a support face at a predetermined first angle to said vertical axis; and a plurality of base brackets, the number of base brackets being at least equal to the number of antenna elements to be supported, each base bracket having a base leg secured against said support plate at a predetermined distance from a support plate center, and a snap lock member projecting upwardly from said base bracket at a predetermined second angle to said vertical axis towards a respective side edge of said top bracket member, the second angle being equal to the first angle, and the snap lock member comprising means for releasable snap lock engagement with the lower edge of a respective antenna element.

2. The assembly as claimed in claim 1, wherein the support plate and base brackets having interengageable first and second fastener devices, respectively, for releasable engagement to secure each base bracket to the support plate, the first fastener devices each being positioned at a predetermined distance from said center and at a predetermined spacing from the adjacent first fastener devices, whereby the patch antenna elements are supported in an array about the central axis and are each held at a predetermined orientation relative to said central axis.

3. The assembly as claimed in claim 2, wherein the support plate has a plurality of openings comprising said first fastener devices, and each of said base brackets has at least one downwardly depending snap lock pin comprising a said second fastener device for snap lock engagement through a respective one of said openings.

4. The assembly as claimed in claim 1, wherein each clip device includes a downwardly depending, second snap lock member for releasable snap lock engagement with a respective patch antenna element.

5. The assembly as claimed in claim 4, wherein each patch antenna element has an opening at a predetermined distance from said upper edge, and said second snap lock member has an upwardly projecting hook for snap engagement in said opening.

6. The assembly as claimed in claim 4, wherein each second snap lock member extends at the same angle as said clip device support face.

7. The assembly as claimed in claim 1, wherein each patch antenna element has at least one opening at a predetermined distance from said lower edge, and said snap lock member has a hook for snap engagement in said opening.

8. The assembly as claimed in claim 7, wherein said snap lock member includes a clip for engaging over the lower edge of said antenna element.

9. The assembly as claimed in claim 7, wherein each patch antenna element has spaced openings each spaced said predetermined distance from said lower edge, and respective pairs of said base brackets are secured at predetermined positions on said support plate for engaging the lower edge of each antenna element and for snap engagement in said openings, the number of base brackets being equal to at least the number of antenna elements to be supported.

10. The assembly as claimed in claim 1, wherein said first and second predetermined angles are in the range from 10° to 80° to said vertical axis.

11. The assembly as claimed in claim 10, wherein the predetermined angles are in the range from 30° to 60° to said vertical axis.

12. The assembly as claimed in claim 1, wherein said base bracket is of generally triangular shape, including said base leg for engagement with said support plate, an upright leg extending upwardly from one end of said base leg and having an inclined upper end face, and said snap lock member extending upwardly at said predetermined second angle from the opposite end of said base leg towards said upper end face of said upright leg, said inclined upper end face extending at the same angle as said snap lock member to form a support surface for said antenna element.

13. A mounting assembly for releasably securing a plurality of plates in an array about a central axis, with each plate supported at a predetermined angle to the central axis and at a predetermined angular spacing from the next adjacent plates, the assembly comprising:

a top bracket having a central axis and a plurality of side edges, the number of side edges being at least equal to the number of plates to be supported, each side edge having a downwardly depending rim inclined at a predetermined first angle to said central axis and a clip device for receiving an upper edge of a plate to be supported with a rear face of the plate resting on said inclined rim; and a plurality of base brackets, the number of base brackets being at least equal to the number of plates to be supported, each base bracket having a base leg and a fastener for securing the base leg against a support surface extending perpendicular to said central axis, and a snap lock member extending upwardly at a predetermined second angle to said base leg for snap lock engagement with a lower edge of a plate extending at said first angle to said central axis;

whereby an array of plates is supported about said central axis with the upper edge of each plate supported in a respective clip device of said top bracket and held at said predetermined first angle against the respective downwardly depending rim and the lower edge of each plate engaging with said snap lock member of at least one respective base bracket.

14. The assembly as claimed in claim 13, wherein each clip device includes a downwardly depending snap lock member for releasable snap lock engagement with a respective patch antenna element.

15. The assembly as claimed in claim 14, wherein each patch antenna element has an opening at a predetermined distance from said upper edge, and said snap lock member has an upwardly projecting hook for snap engagement in said opening.

16. The assembly as claimed in claim 13, wherein each snap lock member includes a clip for engaging over the lower edge of said antenna element.

17. The assembly as claimed in claim 13, wherein said first and second predetermined angles are in the range from 10° to 80° to said vertical axis.

18. The assembly as claimed in claim 17, wherein said predetermined angles are in the range from 30° to 60° to said vertical axis.

19. The assembly as claimed in claim 13, wherein each base bracket is of generally triangular shape, including said base leg for engagement with said support surface, an upright leg extending upwardly from one end of said base leg and having an inclined upper end face, and said snap lock member extending upwardly at said predetermined second angle from the opposite end of said base leg towards said upper end face of said upright leg, said inclined upper end face extending at the same angle as said snap lock member to form a support surface for said antenna element.

20. A plate mounting assembly for mounting an array of plates at predetermined angles about a central axis, comprising:

an array of inclined plates each having an up per edge and a lower edge, the array having a central axis;

a base extending transverse to said central axis;

a plurality of base brackets secured to s aid base at spaced intervals around said central axis, each base bracket being located at a predetermined distance from said central axis and at a predetermined angular spacing from an adjacent base bracket;

each base bracket having an upwardly projecting snap lock device projecting at a predetermined angle towards said central axis, said snap lock device comprising a resilient arm having an upper free end, and an upwardly facing hook member at said free end, and a groove spaced downwardly from said hook member for receiving the lower edge of a respective plate;

each plate having at least one opening spaced a predetermined distance from said lower edge, whereby the hook member of a respective base bracket will snap into said opening when the lower edge of said plate is inserted in said groove; and a top bracket having a center lying on said central axis and a plurality of side edges, the number of side edges being at least equal to the number of plates, each side edge having a downwardly depending, inclined rim and a clip for receiving the upper edge of a respective one of said plates, the inclined rims being oriented at a predetermined angle corresponding to the angle of the snap lock devices of the base brackets and comprising support faces for supporting said rear face of the respective plates;

whereby each plate is supported at a predetermined angle to said base support plate between at least one of said base brackets and the clip of a respective side edge of said top bracket.

21. A plate mounting assembly for mounting an array of plates at predetermined angular spacings around a central axis, the assembly comprising:

a plurality of inclined plates supported in an array around a central axis, each plate being located at a predetermined angular spacing from the next adjacent plates in the array and at a predetermined angle to said central axis, and each plate having a lower edge at a predetermined spacing from said central axis, and an upper edge;

a support member extending transverse to said central axis at the lower edges of said plates;

a plurality of base brackets secured to said support member, at least one base bracket being secured adjacent the lower edge of each plate, and each base bracket having an upwardly projecting, inclined snap lock means for snap lock engagement with the lower edge of the respective plate, the base bracket further comprising means for supporting said respective plate at said predetermined angle; and a top bracket having a central axis aligned with the central axis of said support member and a plurality of side edges aligned with the respective upper edges of said plates, each side edge having a downwardly depending, inclined rim at said predetermined angle for supporting a respective plate, and a downwardly facing, inclined clip for releasably receiving the upper edge of the respective plate.

22. The assembly as claimed in claim 21, wherein each side edge of the top bracket further includes downwardly projecting second snap lock means for snap lock engagement with the upper edge of the respective plate.

23. The assembly as claimed in claim 22, wherein said second snap lock means comprises an inclined snap lock arm extending at said predetermined angle and an upwardly facing latch member at the free end of said snap lock arm, each plate having an opening at a predetermined spacing from said upper edge for receiving said latch member when said upper edge is engaged in said clip.

24. The assembly as claimed in claim 21, wherein two spaced base brackets are secured adjacent the lower edge of each plate for snap lock engagement with said plate.

25. The assembly as claimed in claim 21, wherein said snap lock means comprises a snap lock arm having an upwardly facing latch member, each plate having an opening at a predetermined distance from said lower edge for receiving the latch member of a respective base bracket.

26. The assembly as claimed in claim 25, wherein each base bracket has an upwardly inclined groove spaced downwardly from said latch member for retaining the lower edge of a respective plate when said latch member engages in said opening.

27. A support bracket for supporting the lower edge of a plate, comprising:

a lower leg for securing against a substantially flat support surface, the lower leg having opposite first and second ends;

an upright leg extending upwardly from the first end of said lower leg and having an upper, inclined end face at a predetermined angle to said lower leg;

a snap lock arm extending upwardly from the second end of said lower leg at said predetermined angle towards said upper end face of said upright leg, said snap lock arm having a lower end and an upper end; and a clip device at the lower end of said snap lock arm receiving the lower edge of a plate to be supported at said predetermined angle and for engaging an opening in said plate spaced from said lower edge.

28. The support bracket as claimed in claim 27, including at least one fastener member extending downwardly from said lower leg for securing said bracket to said support surface.

29. The support bracket as claimed in claim 28, wherein said fastener member comprises a split pin for snap lock engagement through an opening in said support surface.

30. A top support device for supporting the upper edges of a plurality of inclined plate s arranged in an array around a central axis, comprising:

a bracket having a central axis and a plurality of side edges for supporting the top edges of a plurality of inclined plates arranged in an array around said central axis; and each side edge having a downwardly inclined rim forming a support surface for an upper edge portion of a respective plate, a downwardly facing groove for receiving the upper edge of the respective plate, and a downwardly depending, inclined snap lock arm having a latch member spaced a predetermined distance from said groove for snap lock engagement through an opening spaced from the upper edge of the respective plate.

31. A support assembly for supporting a plurality of inclined plates arranged in an array around a central axis, comprising:

a top support bracket having a central axis and a plurality of side edges for supporting the top edges of a plurality of inclined plates arranged in an array around said central axis;

each side edge having a downwardly inclined rim at a predetermined first angle to said central axis, the rim forming a support surface for an upper edge portion of a respective plate, a downwardly facing groove for receiving the upper edge of the respective plate, and a downwardly depending, inclined first snap lock arm having a latch member spaced a predetermined distance from said groove for snap lock engagement through an opening spaced from the upper edge of the respective plate; and a plurality of base brackets for supporting the lower edges of the inclined plates;

each base bracket having a lower leg for securing against a substantially flat support surface, and a second snap lock arm extending upwardly from the lower leg at a predetermined angle equal to said first angle for snap engagement in an opening spaced from the lower edge of the respective plate, and a clip device at the lower end of said snap lock arm for receiving the lower edge of the respective inclined plate.

32. An antenna mounting assembly for securing one or more patch antenna elements over a support surface each having a generally rectangular shape with a lower edge positioned adjacent to and over said support surface and an upper edge positioned farther away from said support surface, comprising:

a top bracket member having a central portion aligned with a central vertical axis extending from said support surface, a plurality of side edges at least equal in number to a number of patch antenna elements to be supported, and at least one clip device on each side edge for releasable engagement with the upper edge of a respective antenna element, each of said at least one clip devices having a support face at a predetermined first angle to said vertical axis; and at least one base bracket for each antenna element to be supported, each base bracket having a base leg for securing said base bracket to said support surface at a predetermined distance from said central axis, and a snap lock member projecting upwardly from said base bracket at a predetermined second angle to said vertical axis towards a respective side edge of said top bracket member, the second angle being equal to the first angle, and the snap lock member comprising means for releasable snap lock engagement with the lower edge of a respective antenna element.

33. The assembly as claimed in claim 32, wherein said base brackets have at least one downwardly depending snap lock pin for snap lock engagement through openings present in said support surface.

34. The assembly as claimed in claim 32, wherein said clip device comprises an upwardly projecting hook for snap engagement in an opening in an antenna element to be supported at a predetermined distance from an upper edge.

35. The assembly as claimed in claim 32, wherein said snap lock member has an upwardly projecting hook for snap engagement in an opening in an antenna element to be supported at a predetermined distance from a lower edge.

36. The assembly as claimed in claim 32, wherein snap lock member includes a clip for engaging over a lower edge of an antenna element.

37. The assembly as claimed in claim 32, wherein base bracket is of generally triangular shape, including said base leg for engagement with said support surface, an upright leg extending upwardly from one end of said base leg and having an inclined upper end face, and said snap lock member extending upwardly at said predetermined second angle from the opposite end of said base leg towards said upper end face of said upright leg, said inclined upper end face extending at the same angle as said snap lock member to form a support surface for an antenna element.

38. A plate mounting assembly for mounting one or more inclined plates on a support member at predetermined angular spacings around a central axis extending transverse to said support member and at a predetermined angle to said central axis, each plate having a lower edge positioned adjacent to said support surface and at a predetermined spacing from said central axis, and an upper edge positioned farther away from said support surface, the assembly comprising:

a plurality of base brackets having base legs for being secured to said support member, and each base bracket having an upwardly projecting, inclined snap lock means for snap lock engagement with the lower edge of the respective plate to be mounted, the base bracket further comprising means for supporting said respective plate at said predetermined angle; and a top bracket having a central axis aligned with the central axis of said support member and a plurality of side edges each for alignment with a respective upper edge of one of said plates to be mounted, each side edge having a downwardly depending, inclined rim at said predetermined angle for supporting a respective plate, and a downwardly facing, inclined clip for releasably receiving the upper edge of the respective plate.

39. The assembly as claimed in claim 38, wherein said inclined rim is oriented at a predetermined angle corresponding to the angle of the snap lock means of the base brackets, said snap lock means comprising support faces for supporting said rear face of the respective plates.

40. The assembly as claimed in claim 38, wherein each side edge of the top bracket further includes downwardly projecting second snap lock means for snap lock engagement with the upper edge of the respective plate.

41. The assembly as claimed in claim 38, wherein each of said base brackets is secured to said support member at spaced intervals around said central axis, located at a predetermined distance from said central axis and at a predetermined angular spacing from an adjacent one of said base brackets.

42. The assembly as claimed in claim 38, wherein each of said upwardly projecting snap lock means projects at a predetermined angle towards said central axis, and comprises a resilient arm having an upper free end, and an upwardly facing hook member at said free end, and an upwardly inclined groove spaced downwardly from said hook member for receiving the lower edge of a respective plate.

43. The assembly as claimed in claim 42, wherein the hook member is dimensioned for engaging an opening in a plate spaced a predetermined distance from said lower edge when the lower edge of said plate is inserted in said groove.

* * * * *